(12) United States Patent
Wu

(10) Patent No.: US 8,297,147 B2
(45) Date of Patent: Oct. 30, 2012

(54) GUIDING-WIRE CONTROLLING ROD DEVICE FOR CHAIR ADJUSTMENT

(76) Inventor: Yao-Chuan Wu, Chiayi Hsien (TW)

( * ) Notice: Subject to any disclaimer, the term of this patent is extended or adjusted under 35 U.S.C. 154(b) by 341 days.

(21) Appl. No.: 12/753,605

(22) Filed: Apr. 2, 2010

(65) Prior Publication Data
US 2011/0239810 A1   Oct. 6, 2011

(51) Int. Cl.
*F16C 1/10* (2006.01)
(52) U.S. Cl. ...................................... 74/502.2
(58) Field of Classification Search ............... 74/471 R, 74/502.2, 502.4, 502.6; 297/85 C, 300.8, 297/301.7, 463.1; 188/24.21
See application file for complete search history.

(56) References Cited

U.S. PATENT DOCUMENTS

| | | | | |
|---|---|---|---|---|
| 3,134,269 A * | 5/1964 | Shimanckas | ................ | 477/113 |
| 4,320,673 A * | 3/1982 | Wegert | ..................... | 477/121 |
| 4,691,584 A * | 9/1987 | Takaishi et al. | ............. | 74/471 R |
| 5,660,081 A * | 8/1997 | Sato | ............................. | 74/502 |
| 5,829,314 A * | 11/1998 | Scura | ............................ | 74/502.4 |
| 7,445,092 B2 * | 11/2008 | Tachiiri et al. | ................ | 188/2 D |
| 8,042,428 B2 * | 10/2011 | Shimizu et al. | .............. | 74/502.4 |

* cited by examiner

Primary Examiner — Vicky Johnson
(74) *Attorney, Agent, or Firm* — Alan Kamrath; Kamrath IP Lawfirm, PA

(57) ABSTRACT

A guiding-wire controlling rod device for chair adjustment is pivotally attached inside a housing by a rotation plate of a pivoting rod. The rotation plate has two sides each with a guiding-wire retaining notch and has multiple abutting flat surfaces formed at a front end of the rotation plate to abut with a resilient sheet to position the rotation plate at different angles. Moreover, a rear end of a controlling rod of the pivoting rod has a pivotal hole to pivotally engage with another controlling rod to drive other guiding-wires. Thereby, the controlling rods are aligned and control respectively multiple guiding-wires for different functions.

9 Claims, 13 Drawing Sheets

GUIDING-WIRE CONTROLLING ROD DEVICE FOR CHAIR ADJUSTMENT

BACKGROUND OF THE INVENTION

1. Field of the Invention

The present invention relates to a guiding-wire controlling rod device for chair adjustment having a pivoting rod pulling guiding-wires and a controlling rod pivotally aligning to the pivoting rod so that the guiding-wire controlling rod device has multiple operational stages and functions to respectively control the guiding-wires to simplify the setup procedure and to facilitate a user's operation.

2. Description of Related Art

A comfortable chair must have multiple adjustment devices for various functions, such as up-down adjustment of a seat, forward-backward adjustment of a backrest, inclining adjustment of a backrest, etc. Because those adjustment devices are controlled by pulling of a guiding-wire, each adjustment device has a single controlling rod collectively attached under the seat for operating by a user. Therefore, a chair with various functions must have several controlling rods under the seat to allow the user to select between different functions in operation.

Although the conventional chair with multiple adjustment devices has its controlling rods for different functions mounted under the seat for handy operation by the user, too many controlling rods make remembering the precise location of a particular one difficult for the function he/she desires. Thus, the user has to get up from the chair to check for the right controlling rod. Therefore, it not only fails the setup intention of the controlling rods under the chair (it is suppose to allow the user to operate when sitting on the chair) to cause inconvenience in practical operation, but also influences the appearance of the chair.

Although a conventional multiple adjustment device achieves the fundamental requirement and efficiency in respect of a chair application, it still has drawbacks and insufficiency about the environmental issue, stability, economic and development efficiency, and exclusivity of industrial application so that it cannot develop more specific industrial application.

SUMMARY OF THE INVENTION

A main objective of the present invention is to provide a guiding-wire controlling rod device that controls different adjustment devices thereby.

To achieve the foregoing objective, the guiding-wire controlling rod device for chair adjustment comprises a pivoting rod with a rotation plate having two sides and two wire-retaining notches defined on the two sides respectively. The rotation plate is pivotally attached inside a housing for pulling two guiding-wires. A controlling rod extends from the rotation plate to further pivotally engage a triggering rod for controlling at least one more guiding-wire.

The rotation plate has a front end and multiple abutting flat surfaces formed on the front end. The controlling rod has a wire-guiding groove and a pivot hole substantially perpendicular to the pivot hole of the rotation plate.

The housing is composed of an upper case and a lower case correspondingly combined. The lower case has a front end and a stop formed on the front end. The stop has two wire tubes to align to the wire-retaining notches on the rotation plate. A resilient arc sheet is mounted on the stop to abut one of the multiple abutting flat surfaces.

The triggering rod has a pin hole and has a wire-retaining notch aligning with the wire-guiding groove.

Further benefits and advantages of the present invention will become apparent after a careful reading of the detailed description with appropriate reference to the accompanying drawings.

DETAILED DESCRIPTION OF THE PREFERRED EMBODIMENTS

A guiding-wire controlling rod device for chair adjustment is pivotally attached inside a housing by a rotation plate of a pivoting rod. The rotation plate has two sides each with a guiding-wire retaining notch and has multiple abutting flat surfaces formed at a front end of the rotation plate to abut with a resilient sheet to position the rotation plate at different angles. Moreover, a rear end of a controlling rod of the pivoting rod has a pivotal hole substantially perpendicularly to the rotation plate to pivotally engage with another controlling rod to drive other guiding-wires. Thereby, the controlling rods are aligned and control respectively multiple guiding-wires for different functions.

Figure 1:
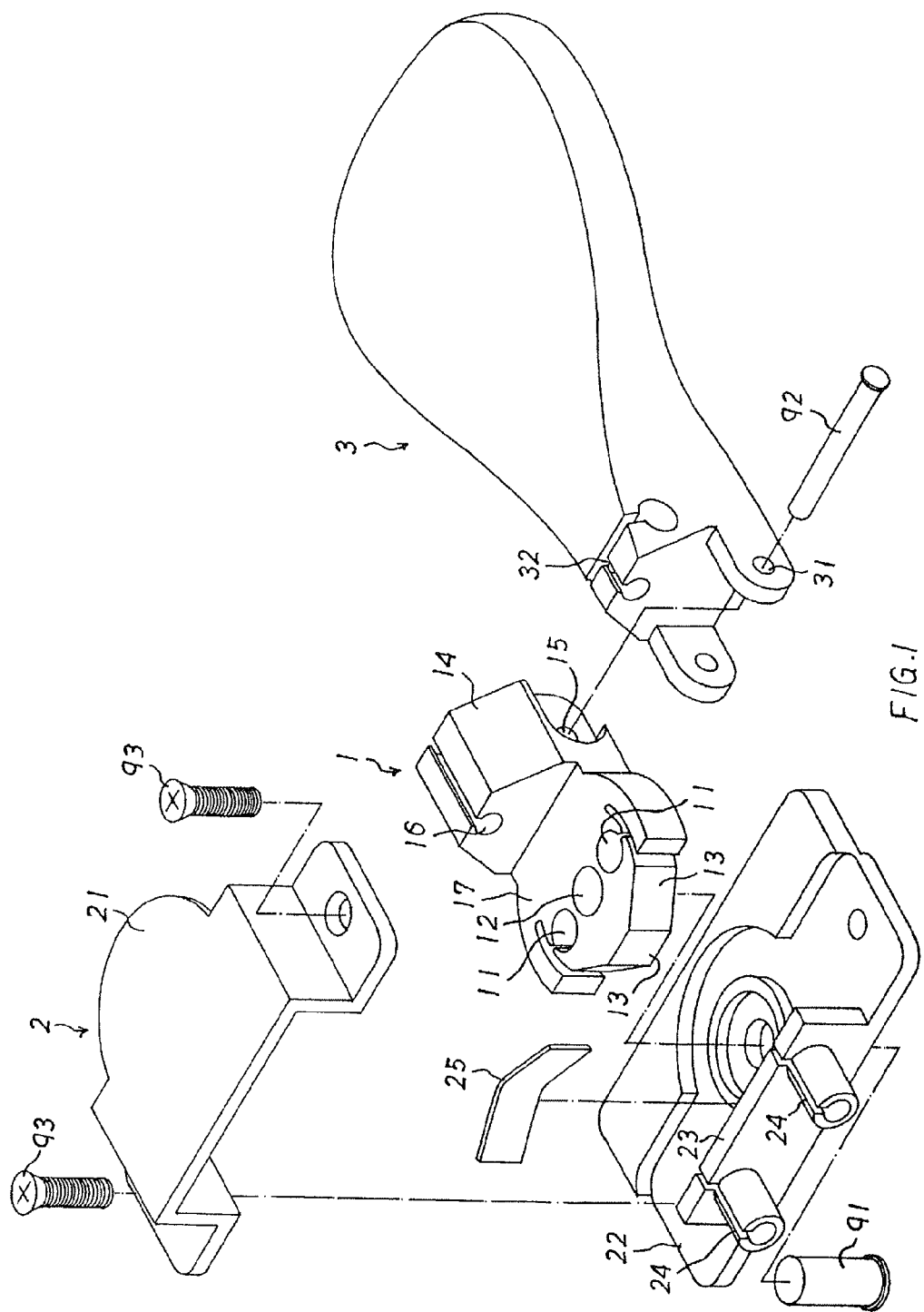
FIG. 1 is an exploded perspective view of one embodiment of a guiding-wire controlling rod device in accordance with the present invention.
Figure 2:
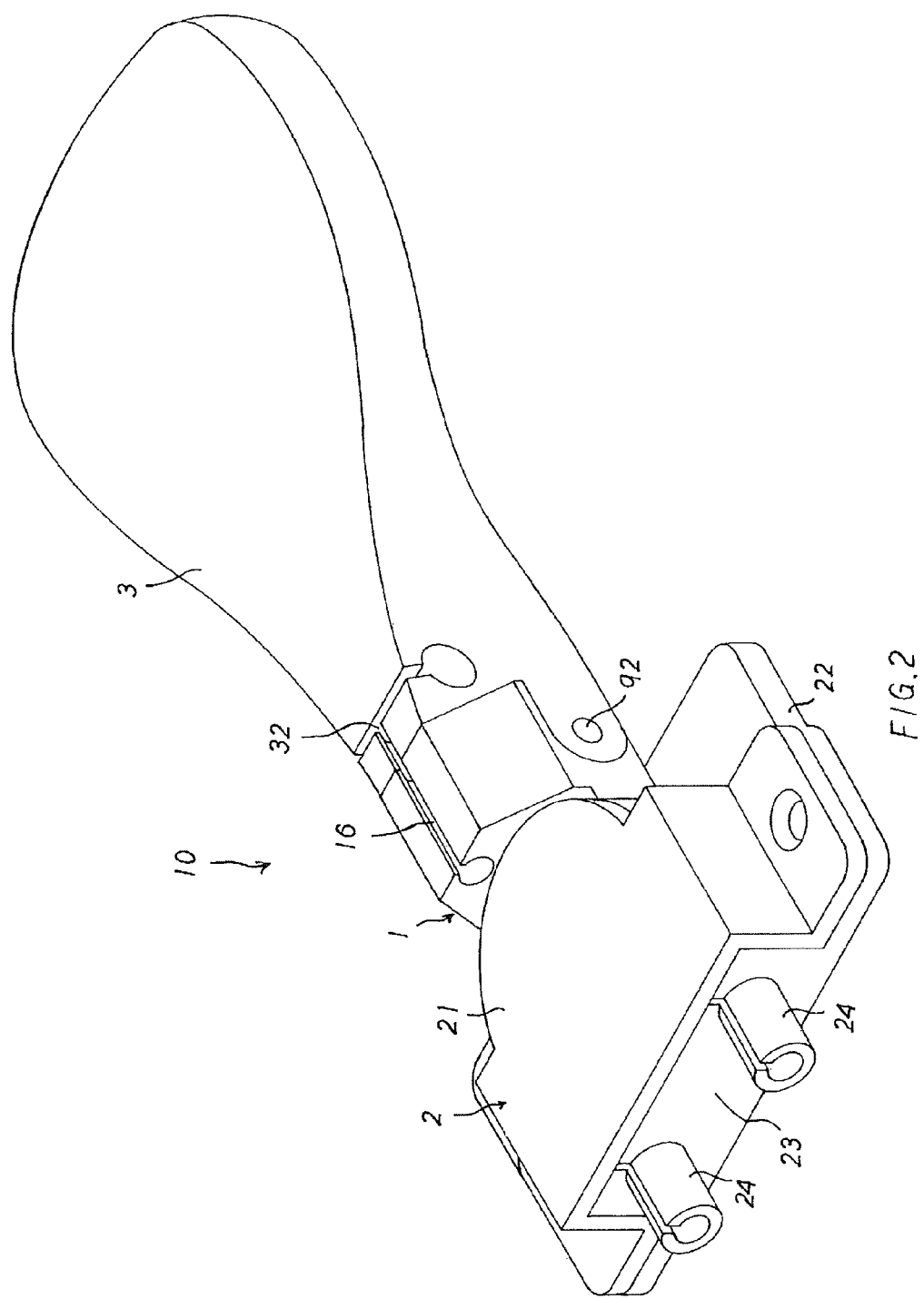
FIG. 2 is a perspective view of the guiding-wire controlling rod device in accordance with the present invention, with the guiding-wire controlling rod device partially assembled.
Figure 3:
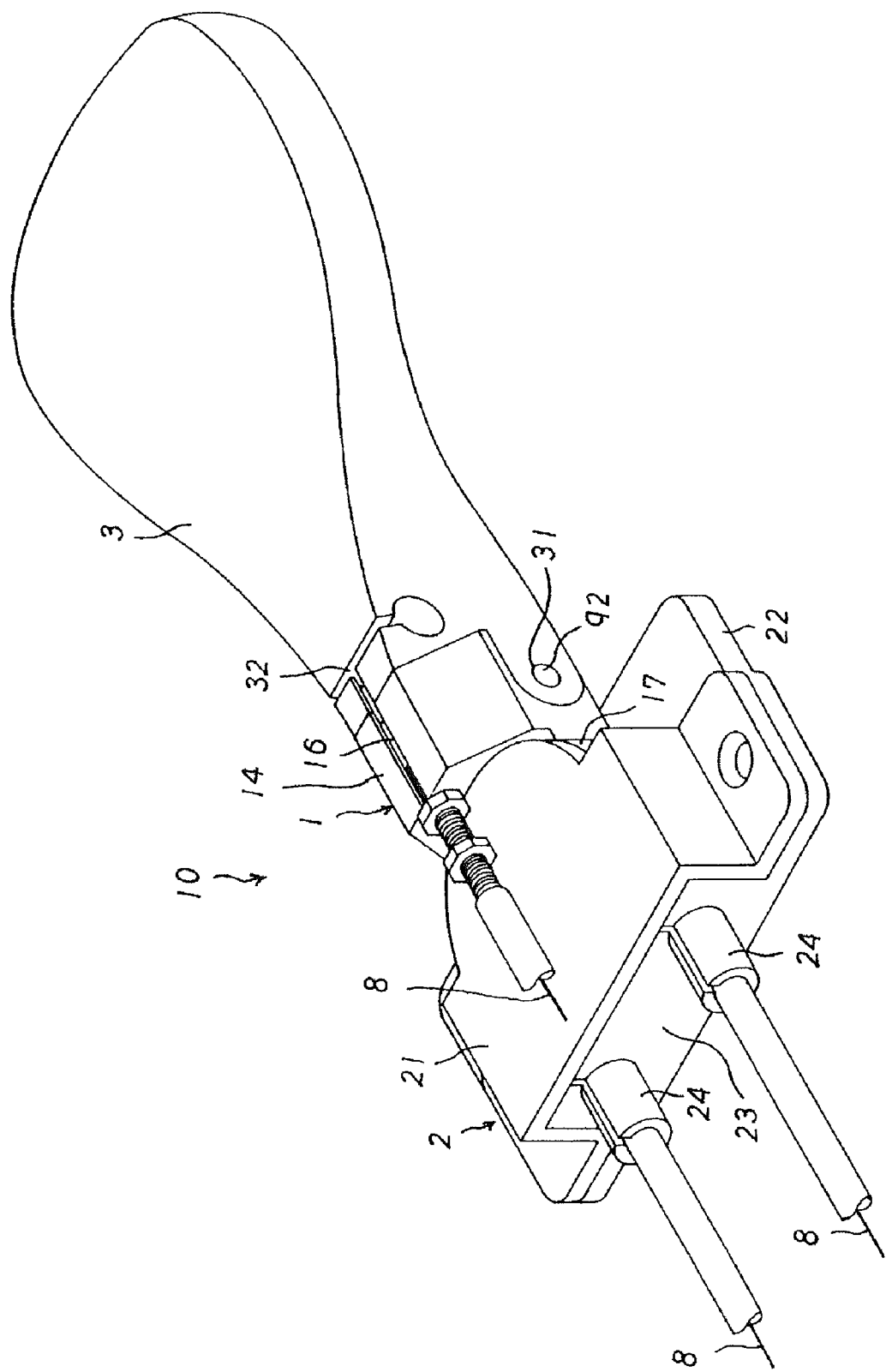
FIG. 3 is a perspective view of the guiding-wire controlling rod device combined with a further guiding-wire.

A guiding-wire controlling rod device for chair adjustment in the present invention is illustrated in a first embodiment in which the guiding-wire controlling rod device 10 has a rotation plate 17 of a pivoting rod 1 with two wire-retaining notches 11 on two sides of the rotation plate 17 respectively and pivotally mounted inside a housing 2 to accommodate two guiding-wires 8 (as shown in FIGS. 1-3). Moreover, a controlling rod 14 of the pivoting rod 1 has a rear end and a pivot hole 15 formed on the rear end and substantially perpendicularly to a pivot hole 12 on the rotation plate 17 to pivotally engage a triggering rod 3 to control other guiding wires 8.

The rotation plate 17 is pivotally mounted inside the housing 2 by the pivot hole 12 to rotate and has the controlling rod 14 extending backward. The rotation plate 17 has a front end and multiple abutting flat surfaces 13 formed on the front end. Additionally, the controlling rod 14 has a wire-guiding groove 16.

An upper case 21 and a lower case 22 correspondingly combined to achieve the housing 2 enclose the rotation plate 17. The lower case 22 has a front end and a stop 23 formed on the front end. The stop 23 has two wire tubes 24 to align to the wire-retaining notches 11 on the rotation plate 17. A resilient arc sheet 25 is mounted inside the housing 2 to abut the stop 23.

The triggering rod 3 has a pin hole 31 and has a wire-retaining notch 32 aligning to the wire-guiding groove 16.

By the above construction, the rotation plate 17 of the pivoting rod 1 is pivotally mounted inside the housing 2 by a shaft 91, and one of the multiple abutting flat surfaces 13 at the front end of the rotation plate 17 is abutted by the resilient arc sheet 25 on the stop 23 to keep the rotation plate 17 positioned. The wires 8 inside the wire-retaining notches 11 extend out of the housing 2 via the two wire tubes 24 respectively. The controlling rod 14, extending backward, is pivotally connected to the triggering rod 3 by a pin 92 and allows another wire 8 to extend out of the housing 2 via the wire-retaining notch 32. Therefore, the assembled guiding-wire controlling rod device 10 is located under the seat by screwing the housing 2 with screws 93 to the seat.

Figure 4:
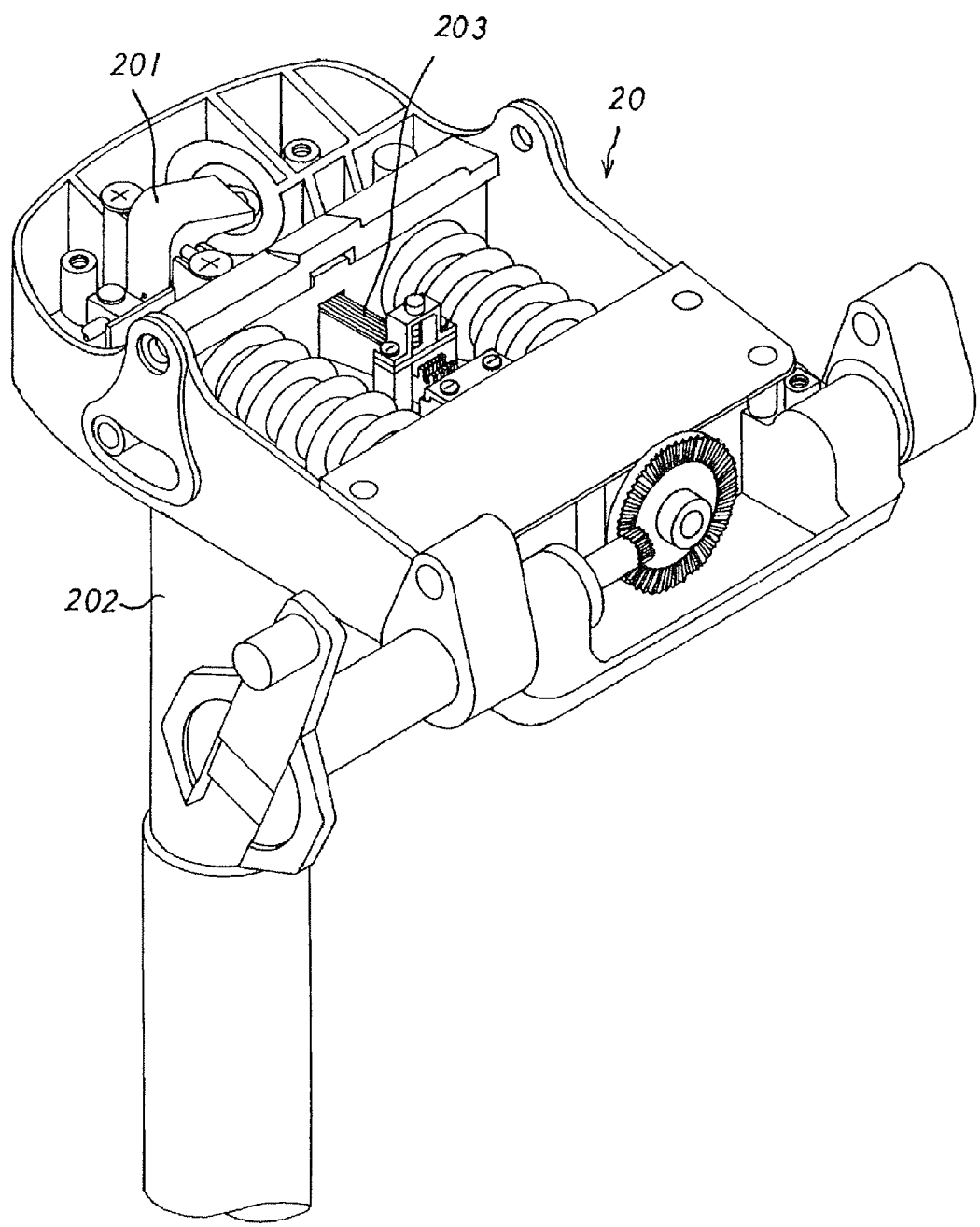
FIG. 4 is a partially perspective view of a chassis under a seat (a up-down adjustment device for a seat)
Figure 5:
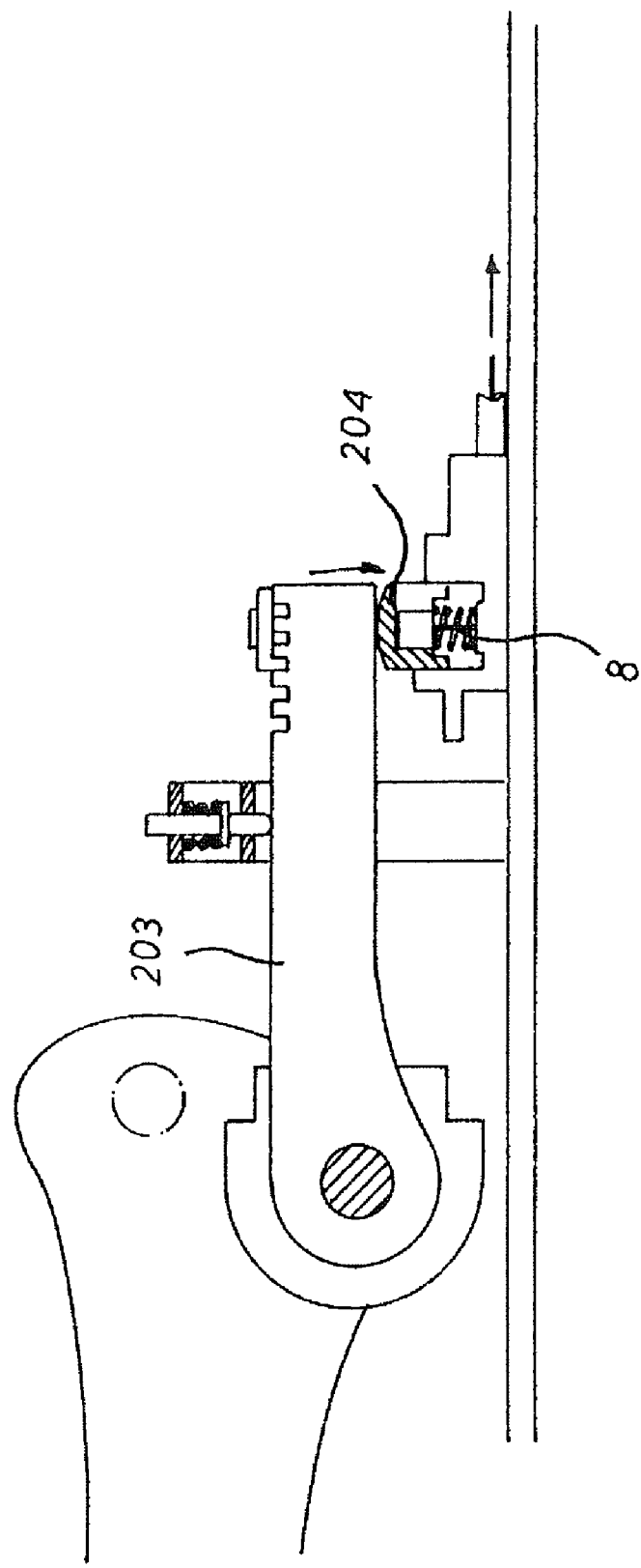
FIG. 5 is a partially cross-sectional side view of a connecting rod driven by restraining blocks pulled by a guiding-wire (an incline adjustment device for a backrest)
Figure 6:
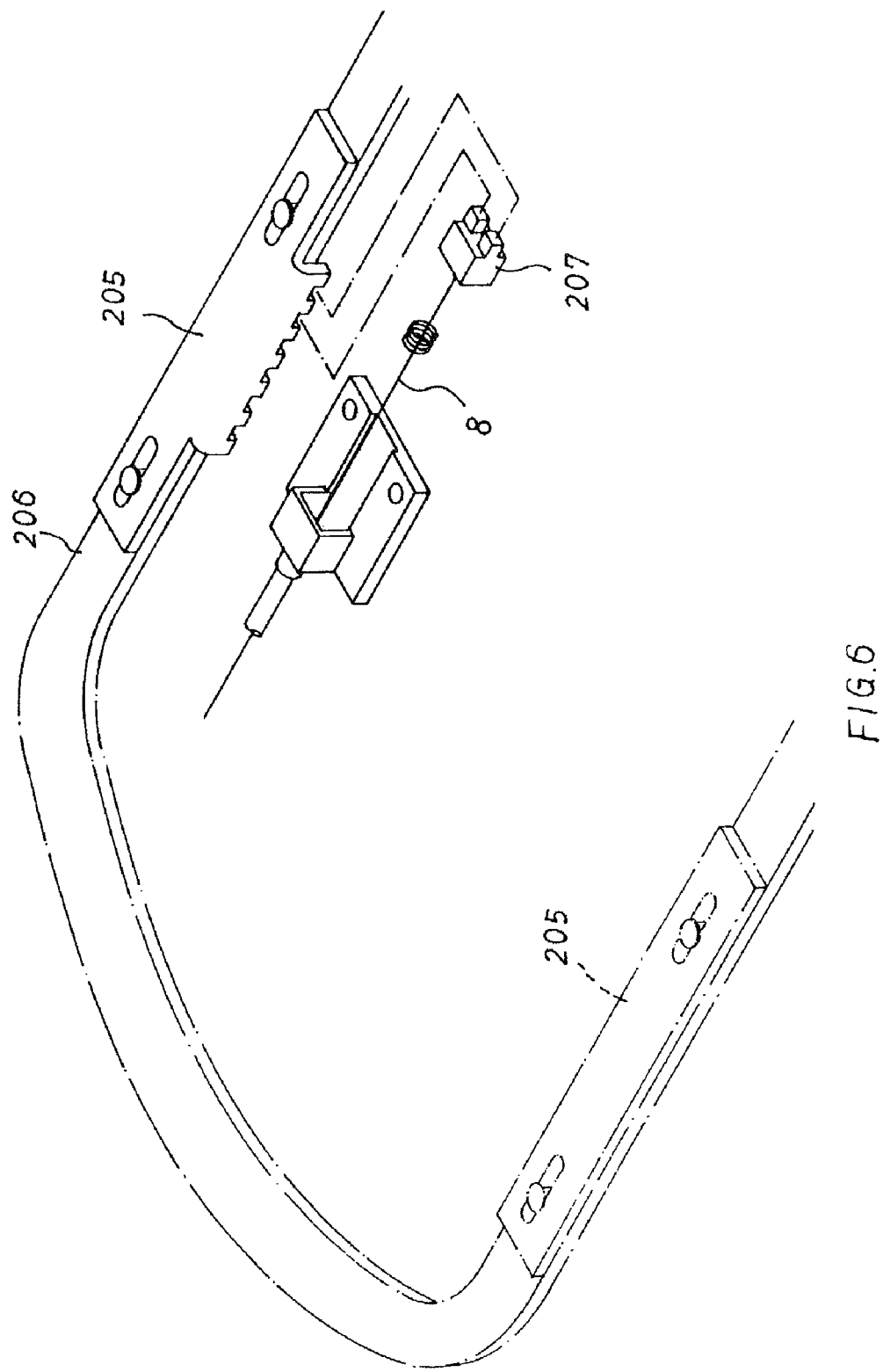
FIG. 6 is a partially exploded perspective view of a positioning block pulled by a guiding-wire (a forward-backward adjustment device for a seat)

The ends of the wires 8 extending out of the wire tubes 24 and the wire-retaining notch 32 respectively directly operate up-down adjustment of a seat, forward-backward adjustment of a backrest, or inclining adjustment of the backrest, etc. and pull and drive the various adjustment devices. As shown in FIG. 4, a chassis of a multi-functional chair 20 has up-down movement actuated by an air cylinder 202 pressed by a pushing arm 201 driven by the guiding-wire 8, and has an inclining adjustment of connecting rod 203 on the backrest controlled by restraining blocks 204 driven by the guiding-wire 8 (as shown in FIG. 5). Additionally, as shown in FIG. 6, a rail 205 is mounted on a chair frame 206 to proceed the forward movement or backward movement by driving a positioning block 207 with the guiding-wire 8. Therefore, the following simply illustrates the operation of the guiding-wire controlling rod device 10.

Figure 7:
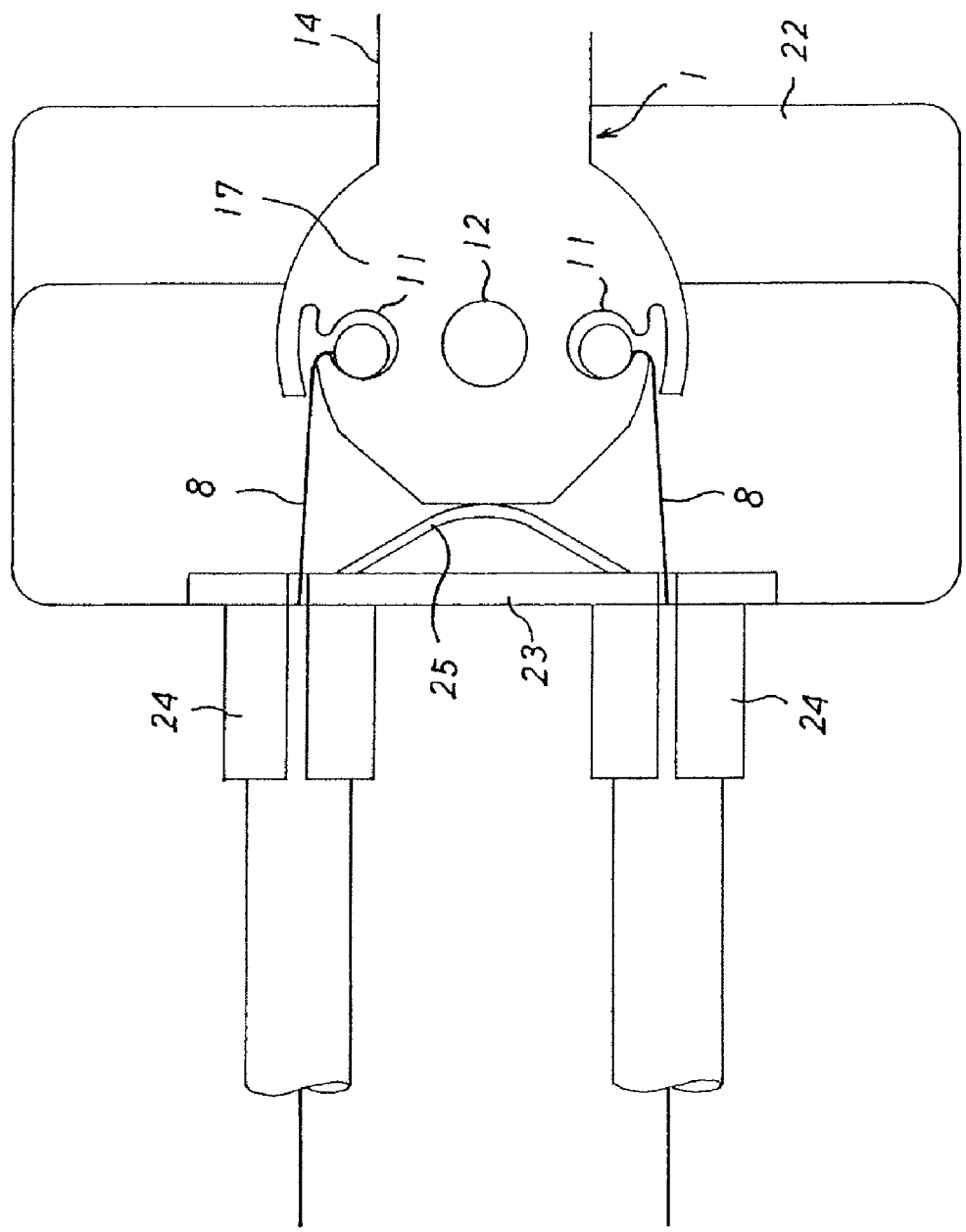
FIG. 7 is a cross-sectional top view of a pivoting rod of the guiding-wire controlling rod device.
Figure 8:
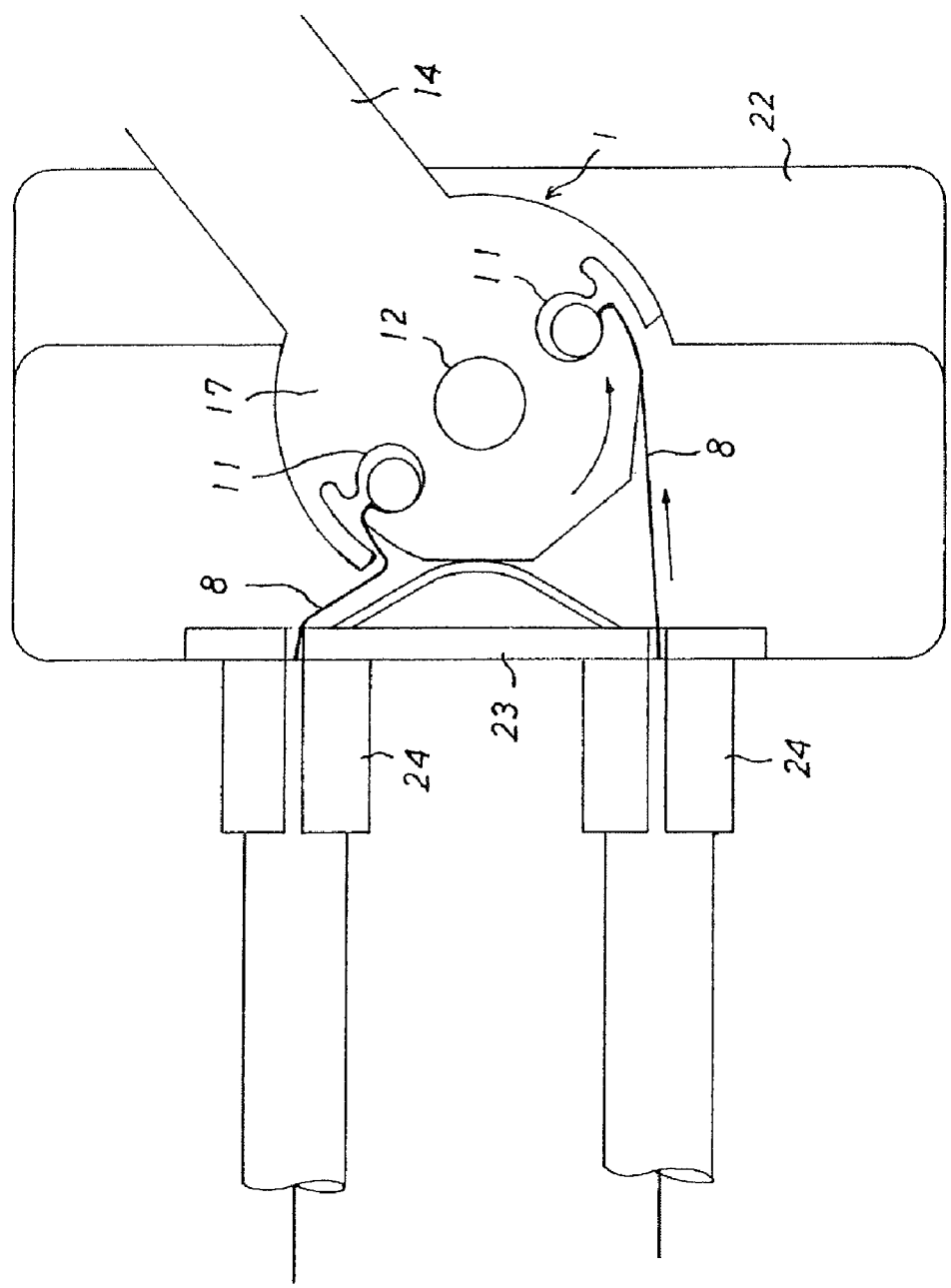
FIG. 8 is an operational cross-sectional top view of the pivoting rod in FIG. 7.

First of all, because the rotation plate 17 of the pivoting rod 1 has the wire-retaining notches 11 on the two sides to provide combination of the two guiding-wires 8 (as shown in FIG. 7) and the abutting flat surfaces 13 on the rotation plate 17 are positioned by the resilient arc sheet 25, the rotation plate 17 is rotated slightly (the resilient arc sheet 25 tightly abuts one of the abutting flat surfaces 13 to pull one guiding-wire 8 and loosen the other guiding-wire 8 when the controlling rod 14 is driven pivotally in a horizontal direction to achieve the control of the adjustment device by pulling the guiding-wire 8 (as shown in FIG. 8, when the guiding-wire 8 is loosened, it does not pull and drive the adjustment device). On the contrary, when the controlling rod 14 is driven in an opposite direction, the other guiding-wire 8 actuates different functional adjustments to achieve the control efficiency with multiple guiding-wires 8.

Moreover, because the pivoting rod 1 is positioned by the resilient arc sheet 25 after being rotated slightly, the guiding-wire 8 keeps pulling when the user does not retrieve the controlling rod 14. Thus, such device is particularly suitable for an incline adjustment of the backrest. Taking continuous pulling as an example, the connecting rod of the backrest is not positioned to make the backrest free to swing, but when the controlling rod 14 is retrieved to loosen the guiding-wire 8, the connecting rod of the backrest is positioned again to keep the inclined angle of the backrest.

Figure 9:
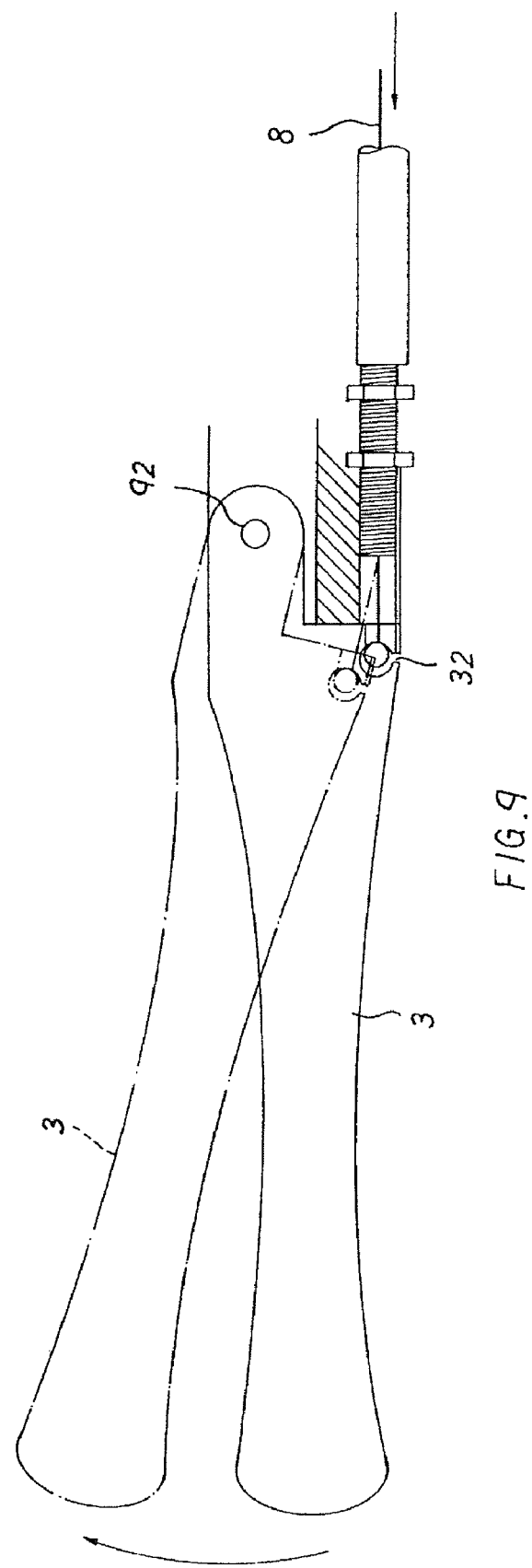
FIG. 9 is an operational cross-sectional side view of a controlling rod of the guiding-wire controlling rod device.

Moreover, by having the controlling rod 14 pivotally connected with the triggering rod 3 by the pin 92, the wire-retaining notch 32 of the triggering rod 3 provides connection of another guiding-wire 8 through the wire-guiding groove 16 to control an adjustment device (as shown in FIG. 9). Thus, the triggering rod 3 is driven in a vertical direction to pull the guiding-wire 8 to proceed functional adjustment and to achieve the aligning combination structure and operational efficiency with multiple guiding-wires 8.

In the above illustration, the pivot hole 12 of the rotation plate 17 and the pivot hole 15 of the controlling rod 14 are substantially perpendicular (with different rotational axial directions). Therefore, the triggering rod 3 directly controls the corresponding adjustment devices when the guiding-wire controlling rod device 10 proceeds to pull the multiple guiding-wires 8. Specifically, when the triggering rod 3 is driven in the vertical direction, the guiding-wire 8 in the wire-retaining notch 32 on the triggering rod 3 is pulled, but when the triggering rod 3 is driven in the horizontal direction, the guiding-wires 8 in the wire-retaining notches 11 on the pivoting rod 1 are pulled. Therefore, this structure not only facilitates the user's operation but also integrates three guiding-wires 8 to be controlled by the triggering rod 3 in the guiding-wire controlling rod device 10, so that the user can easily remember the operation.

Figure 10:
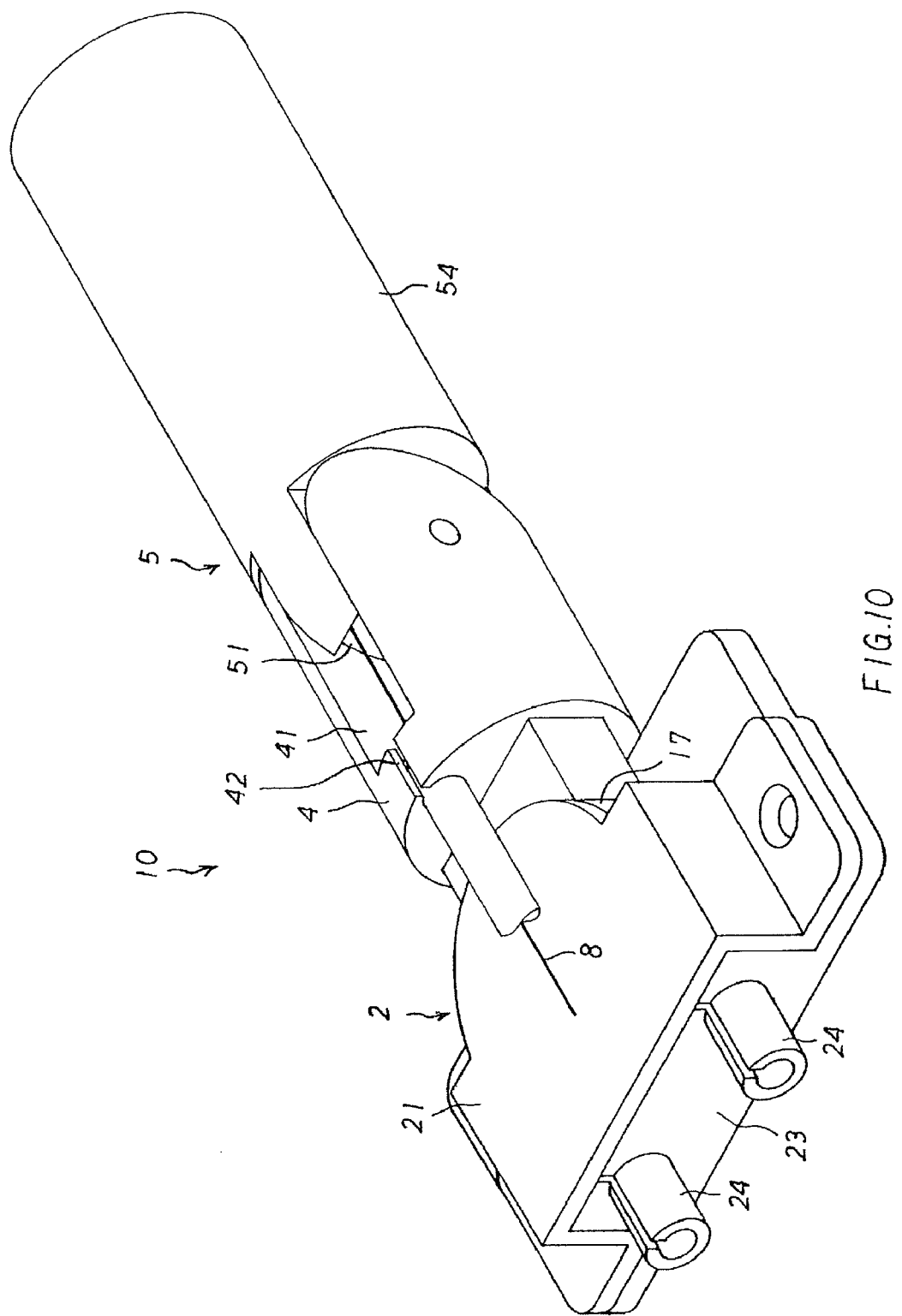
FIG. 10 is a perspective view of another embodiment of the guiding-wire controlling rod device in accordance with the present invention.

In a second embodiment of the guiding-wire controlling rod device 10, the controlling rod 4 on the pivoting rod 1 accommodated in the housing 2 has with a pivot gap 41 at a distal end (as shown in FIG. 10), and two wire-guiding grooves 42 are defined on opposite surfaces of the controlling rod 4 to communicate with the pivot gap 41. A resilient arc sheet 43 is located inside the pivot gap 41 between the two wire-guiding grooves 42.

Figure 11:
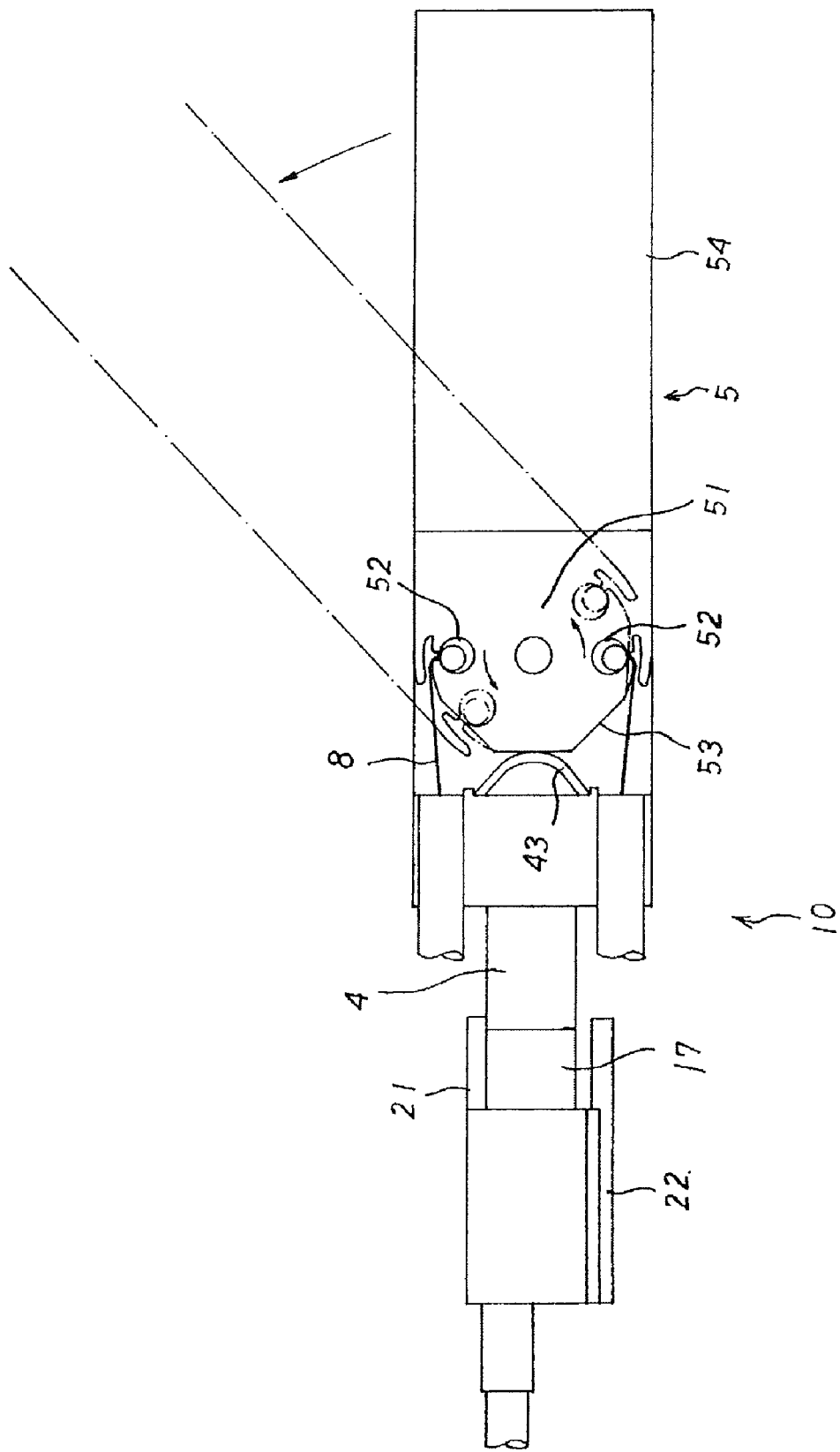
FIG. 11 is an operational perspective view of the embodiment of the guiding-wire controlling rod device in FIG. 10.

The triggering rod 5 has a rotation plate 51 inserted into the pivot gap 41 and perpendicularly to the pivot hole 12 of the rotation plate 17 and has a grip bar 54 extending from the rotation plate 51. The rotation plate 51 has two sides and two wire-retaining notches 52 on the two sides respectively. The rotation plate 51 also has a front end and multiple abutting flat surfaces 53 abutted by the resilient arc sheet 43 (as shown in FIG. 11).

By the above structure combination, the rotation plate 51 on the triggering rod 5 provides two guiding-wires 8 extending through the wire-guiding grooves 42 to pull and drive a corresponding adjustment device. Operation of the trigger rod 5 is the same as for the operation of the pivoting rod 1, with the only difference being the rotation direction whether in horizontal or vertical directions. Thus, the user pulls and drives the different guiding-wires 8 by pulling in different horizontal or vertical directions to achieve the purpose of multi-wire control of the guiding-wire controlling rod device 10.

Figure 12:
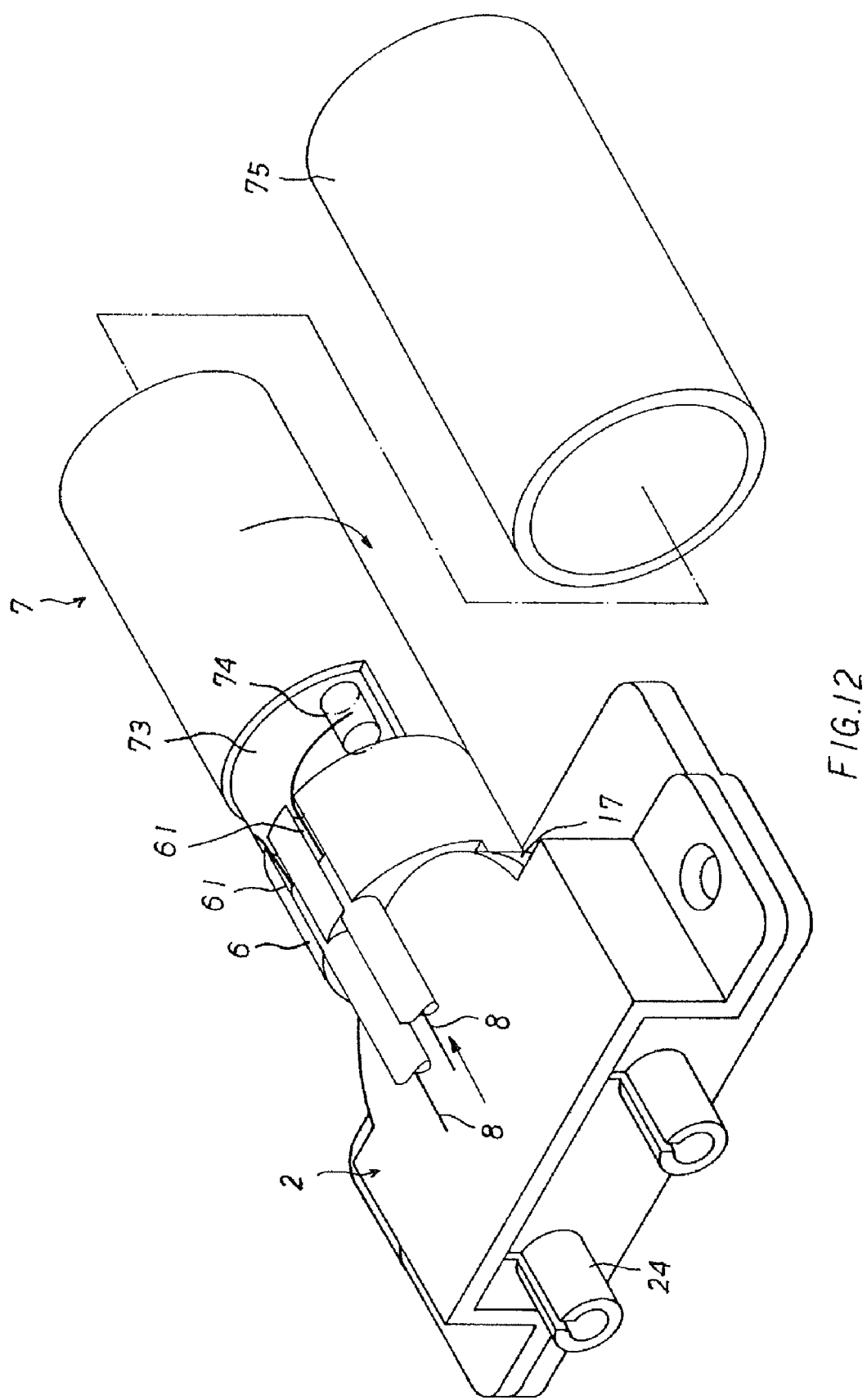
FIG. 12 is a perspective view of still another embodiment of the guiding-wire controlling rod device in accordance with the present invention.

In a third embodiment of the guiding-wire controlling rod device 10, the controlling rod 6 on the pivoting rod 1 accommodated in the housing 2 has two adjacent wire-guiding grooves 61 (as shown in FIG. 12) to keep wires 8 over the housing 2. Moreover, the controlling rod 6 has a threaded hole 62 defined on an end surface.

Figure 13:
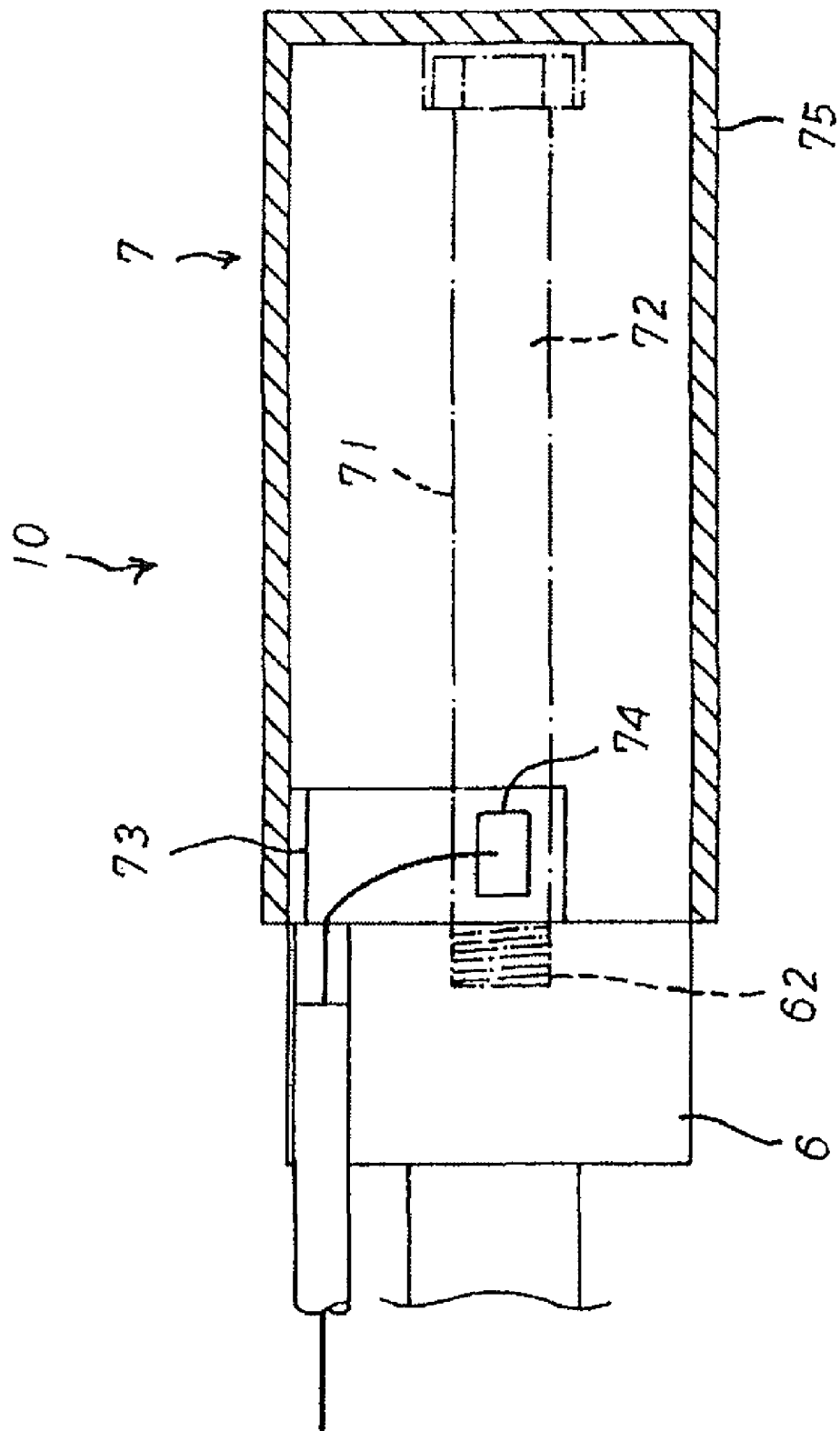
FIG. 13 is an operational perspective view of the embodiment of the guiding-wire controlling rod device in FIG. 12.

The triggering rod 7 has a shaft hole 71 penetrated by a threaded rod 72 and has a recess 73 facing the controlling rod 6. Two sides of the recess 73 each have a wire-retaining notch 74. Moreover, a sleeve 75 surrounds the triggering rod 7 (as shown in FIG. 13).

By the above structure combination, the triggering rod 7 screws into the threaded hole 62 of the controlling rod 6 by penetrating the shaft hole 71 with the threaded rod 72 to make the triggering rod 7 rotatably mounted on the threaded rod 72 engaged with the controlling rod 6. Meanwhile, the guiding-wire 8 is secured to the wire-retaining notch 74 on the triggering rod 7 and then goes through the recess 73 and the wire-guiding groove 61 to operate and pull the adjustment device. Then, the sleeve 75 is secured around the triggering rod 7 so that the guiding-wires 8 are enclosed between the sleeve 75 and the triggering rod 7 in the recess 73. Therefore, when the device works, the triggering rod 7 is pulled in a horizontal direction to drive the guiding-wire 8 on the pivoting rod 1. Moreover, the triggering rod 7 is axially rotated (in clockwise or anti-clockwise directions) to pull a corresponding one of the two guiding-wires 8 to achieve adjustment function by an easy operation.

In above embodiments, by rotation operation and alignment with a different rotating shaft, the triggering rods 3, 5, 7 drive the pivoting rod 1 and pull different guiding-wires 8 by pushing or rotating the triggering rods 3, 5, 7. To make an excellent practice, the guiding-wires 8 of the pivoting rod 1 are preferred for the incline adjustment device for a backrest and the guiding-wires 8 from the triggering rods 3, 5, 7 are preferred for the up-down or frontward-backward movement devices for a seat. To allow a user to easily distinguish the different operations of the guiding-wire controlling rod device 10 for particular functions, the pivoting rod 1 and the triggering rods 3, 5, 7 have different colors or appearance. For example, the pivoting rod 1 is red for the incline adjustment device of a backrest, and the triggering rods 3, 5, 7 are blue for the up-down or frontward-backward movement devices of a seat.

Although this invention has been described in its preferred forms with a certain degree of particularity, it is understood that the present invention of the preferred forms has been made only by way of example, and that numerous changes in the details of construction and the combination and arrangement of parts may be resorted to without departing from the spirit and scope of the invention.

What is claimed is:

1. A guiding-wire controlling rod device for chair adjustment comprising:
    a housing;
    a pivoting rod with a rotation plate having two sides, with the pivoting rod pivotally attached inside the housing for pulling two guiding-wires, with two wire-retaining notches defined on the two sides respectively, with a controlling rod extending from the rotation plate; and
    a triggering rod controlling at least one more guiding-wire, with the triggering rod pivotally connected to the controlling rod, wherein the rotation plate has a front end and multiple abutting flat surfaces formed on the front end; wherein the controlling rod has a wire-guiding groove and a pivot hole substantially perpendicular to the pivot hole of the rotation plate; wherein the housing includes an upper case and a lower case correspondingly combined; wherein the lower case has a front end and a stop formed on the front end of the lower case, wherein the stop has two wire tubes aligned with the wire-retaining notches on the rotation plate; wherein a resilient arc sheet is mounted on the stop to abut one of the multiple abutting flat surfaces; and wherein the triggering rod has a pin hole and has a wire-retaining notch aligning with the wire-guiding groove.

2. The guiding-wire controlling rod device as claimed in claim 1, wherein the two guiding-wires and the at least one more guiding-wire each pull a up-down adjustment device for a seat, a forward-backward adjustment device for the seat and an incline adjustment device for a backrest.

3. The guiding-wire controlling rod device as claimed in claim 1, wherein the pivoting rod and the triggering rod have different colors for distinguishability.

4. A guiding-wire controlling rod device for chair adjustment comprising:
    a housing;
    a pivoting rod with a rotation plate having two sides, with the rotation plate pivotally attached inside the housing for pulling two guiding-wires, with two wire-retaining notches defined on the two sides respectively, with a controlling rod extending from the rotation plate; and
    a triggering rod pivotally connected to the controlling rod, wherein the rotation plate has a front end and multiple abutting flat surfaces formed on the front end; wherein the controlling rod has a pivot gap and two wire-guiding grooves defined on opposite surfaces of the controlling rod to communicate with the pivot gap; wherein a first resilient arc sheet is located on the controlling rod inside the pivot gap between the two wire-guiding grooves;
    wherein the housing includes an upper case and a lower case correspondingly combined; wherein the lower case has a front end and a stop formed on the front end of the lower case, where the stop has two wire tubes aligned with the wire-retaining notches on the rotation plate; wherein a second resilient arc sheet is mounted on the stop to abut one of the multiple abutting flat surfaces;
    wherein the triggering rod has a rotation plate inserted into the pivot gap and has a grip bar extending from the rotation plate of the triggering rod; wherein the rotation plate of the triggering rod has two sides and two wire-retaining notches defined on the two sides respectively for receiving two more guiding-wires; wherein the rotation plate of the triggering rod has a front end with multiple abutting flat surfaces abutted by the first resilient arc sheet.

5. The guiding-wire controlling rod device as claimed in claim 4, wherein the two guiding-wires and the two more guiding-wires respectively pull a up-down adjustment device for a seat, a forward-backward adjustment device for the seat, and an incline adjustment device for a backrest.

6. The guiding-wire controlling rod device as claimed in claim 4, wherein the pivoting rod and the triggering rod have different colors for distinguishability.

7. A guiding-wire controlling rod device for chair adjustment comprising:
    a housing;
    a pivoting rod with a rotation plate having two sides, with the pivoting rod pivotally attached inside the housing for pulling two guiding-wires, with two wire-retaining notches defined on the two sides respectively, with a controlling rod extending from the rotation plate; and
    a triggering rod pivotally connected to the controlling rod, wherein the rotation plate has a front end and multiple abutting flat surfaces formed on the front end; wherein the controlling rod has two adjacent wire-guiding grooves and has a threaded hole defined on an end surface;
    wherein the housing includes an upper case and a lower case correspondingly combined; wherein the lower case has a front end and a stop formed on the front end, wherein the stop has two wire tubes aligned with the wire-retaining notches on the rotation plate; wherein a resilient arc sheet is mounted on the stop to abut one of the multiple abutting flat surfaces;

wherein the triggering rod has a shaft hole penetrated by a threaded rod to secure with the threaded hole of the controlling rod, wherein the triggering rod has a recess facing the controlling rod; wherein two wire-retaining notches are defined on two sides of the recess to extend two more guiding-wires extending through the two adjacent wire-guiding grooves of the controlling rod; and wherein a sleeve surrounds the triggering rod.

8. The guiding-wire controlling rod device as claimed in claim 7, wherein the two guiding-wires and the two more guiding-wires respectively pull a up-down adjustment device for a seat, a forward-backward adjustment device for the seat, and an incline adjustment device for a backrest.

9. The guiding-wire controlling rod device as claimed in claim 7, wherein the pivoting rod and the triggering rod have different colors for distinguishability.

* * * * *